INVENTORS:
BENJAMIN L. GOEPFERT
ROBERT C. VISSER
BY:
THEIR AGENT

United States Patent Office 3,454,051
Patented July 8, 1969

3,454,051
UNDERWATER PIPELINE WITH SPOILERS
Benjamin L. Goepfert, West Covina, and Robert C. Visser, San Dimas, Calif., assignors to Shell Oil Company, New York, N.Y., a corporation of Delaware
Filed Apr. 8, 1966, Ser. No. 541,361
Int. Cl. F16l 9/00
U.S. Cl. 138—178                    7 Claims

ABSTRACT OF THE DISCLOSURE

An underwater pipeline situated along the floor of a body of water is provided with a concrete coating having helical ridges formed about the outer periphery of the coating to reduce the drag and lift effects of the pipeline caused by water movement forces.

---

This invention relates to pipeline apparatus for transporting fluids and more particularly to such apparatus adapted to be positioned on the floor of a body of water. The need for locating fluid transporting pipelines underwater has followed the successful development of offshore oil and gas wells which necessitates a convenient and rapid method of transporting the product to shore. In addition, modern fluid transporting techniques utilize onshore pipelines which may require crossing the bottom of a body of water. The above are but two of the ever developing applications of fluid transporting pipelines positioned on an ocean floor or on the floor of any body of water.

In each instance, these pipelines are subjected to water forces through the single or combined effect of tides, currents, wave action and water turbulence which produce a deleterious effect on the integrity of the pipeline. When a pipeline is positioned on an ocean floor, these water forces create lift and drag components on the pipeline which may reach a sufficient magnitude to move and damage the pipeline. Such damaging water forces are found, for example, at the Cook Inlet of southern Alaska which penetrates for some 170 miles inland from the Gulf of Alaska. Due to the location and particular shape of the inlet, tides are among the highest in the world and range up to 30 feet with resulting rapid currents. In addition, frequent storms plague the inlet with winds up to 60 miles an hour and waves up to 15 feet high. These conditions produce turbulent water and bottom currents of up to 8 knots. Full scale tests were conducted to determine lift and drag coefficients on a pipeline lying on the floor of the Cook Inlet. The tests revealed that conventional pipe would not be stable and remain anchored or fixedly positioned under the designed conditions and accordingly other means would be required to obtain stability.

It is to the solution of this problem that the present invention is directed by providing a pipeline apparatus which substantially obviates or minimizes the effect on the pipeline of the aforementioned water forces.

In accordance with this invention a pipeline is weighted or weight-coated preferably with concrete or other cement-base composition along any portion of the pipeline subject to the deleterious water forces. The coating is formed with outwardly protruding helical ridges or spoilers along a portion of or the entire length of the coating and have a pitch of one revolution per a pipe length equal to 7–15 times the pipe diameter.

In the following detailed description reference will be made to the figures of the drawing in which.

Figure 1:
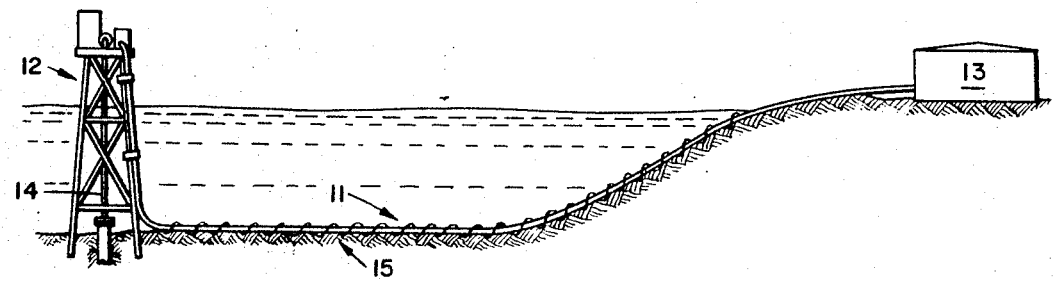
FIGURE 1 is an elevation of a typical installation utilizing the present invention on a pipeline lying on the floor of a body of water.

Referring now to FIGURE 1, a typical installation is shown utilizing the present apparatus in conjunction with a pipeline 11 connecting an offshore facility or production platform 12 and an on-shore storage tank or processing plant 13. As shown, the pipeline serves to transport oil or gas between a well conductor 14 and the storage tank 13, with a major portion of the pipeline adapted to lie on the ocean floor 15. It is noted that the environment shown is by way of example only since the invention may be practiced with any pipeline lying on the floor of a body of water; for example, a pipeline crossing a river bottom or one joining two underwater facilities offshore.

Figure 2:
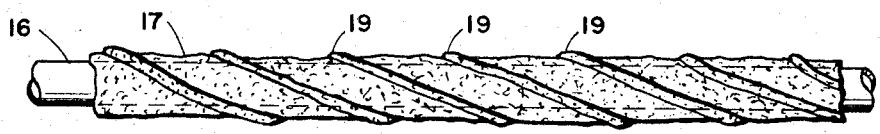
FIGURE 2 is an elongated view of a portion of a pipeline showing the weight coating.

A detailed view of a portion of the pipeline 11 incorporating the subject pipeline apparatus is shown in FIGURE 2, wihch includes a conventional cylindrical pipe 16, preferably constructed of steel. The weight-coating 17 carried by the pipe may consist of any high density material; for example, a grout made a suitable hydraulic cement like portland cement. In addition, other cementitious materials may be used such as concrete and motar.

Figure 3:
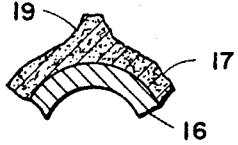
FIGURE 3 is a partial cross-section of the pipeline of FIGURE 2.
Figure 5:
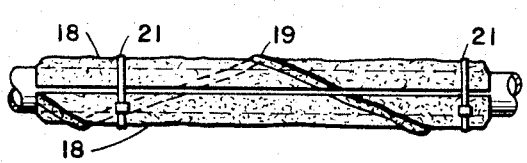
FIGURE 5 is an enlarged view of a pipeline showing another alternative construction.

In a preferred form of the invention, the coating may be applied by spraying a cement grout onto sections of the pipe 16, with pressurized spraying equipment as the pipe is being rotated. This technique is preferred since spraying produces a rough exterior finish which results in smaller lift components than are experienced with a smooth finish. Other suitable methods may be used to apply the coating. It may be molded in situ or preformed in arcuate segments 18 and attached about the pipe with suitable fastening means such as metal straps as shown in FIGURE 5. The cross section of FIGURE 3 shows the relationship of the weight-coating 17 to the pipe 16.

As shown, the thickness of the coating is approximately equal to that of the pipe wall; however, this dimension may be greater or less depending on the additional weight per length of pipeline needed for pipes of different diameter and for varying water conditions. Although the weight coating aids in stabilizing the pipe against the effects of water forces, the addition of weight coating increases the surface area and accordingly the drag and lift forces acting on the pipeline apparatus. Tests have shown that the addition of cement weight coating alone may be insufficient to overcome the resultant lift and drag components acting on a pipeline lying on the floor of a turbulent body of water, for example, the Cook Inlet in Alaska where bottom currents may reach up to 8 knots per hour.

Thus, additional means are provided on the coating in the form of outwardly protruding helical ridges or spoilers 19. The spoilers are preferably formed integrally with the coating by the spraying method used to apply the coating thus producing a rough finish. They may, however, be formed by any suitable method at the same time the coating is applied or they may be subsequently added. Although at least three longitudinally spaced spoilers are preferred as shown in FIGURE 2, any number of spoilers with predetermined spacing may be employed without departing from the scope of this invention. Each spoiler forms at least a portion of a helix and has a preferred pitch of one revolution in a length of pipeline equal to 7–15 times the pipe diameter. Thus, with larger-diameter pipes it is desirable to employ several longitudinally spaced spoilers so that more spoiled surface is exposed.

For example, if twelve-inch pipe is coated the minimum pitch would be one spoiler revolution per 7 feet of length, but if two-inch pipe is used the spoilers complete a minimum revolution in 14 inches of pipe length.

Figure 4:
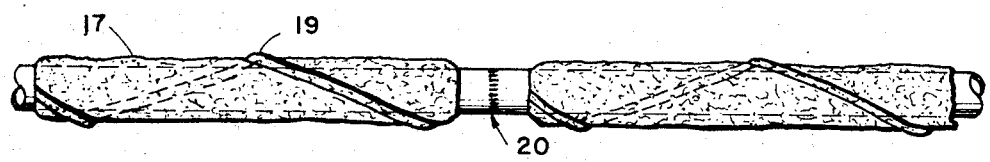
FIGURE 4 is an enlarged view of a pipeline showing one alternative construction of the weight coating.

The pipe may be coated continuously along a section of pipe as shown in FIGURE 2, or, in the alternative, it may be coated at spaced intervals as shown in FIGURE 4. The latter construction permits precoating of pipelines which may be subsequently joined by welding as shown at 20 or other suitable means. In addition, by spacing the coating it results in a more flexible coated pipeline apparatus capable of being more readily laid on the floor of a body of water from a lay barge.

In operation, when the pipeline apparatus is installed on the floor of a body of water as shown in FIGURE 1, the combined effects of the weight coating 17 and the spoilers 19 substantially eliminate or minimize the underwater forces tending to displace the pipeline from its original laid position. In addition to the spoilers reducing the lift coefficient, the spoilers also provide an increased frictional area which cooperates with the ocean floor to resist displacement of the pipeline along the floor. Also, if the pipeline becomes partially or even fully buried due to soft bottom conditions, the weight of the sand acting on the spoilers tends to hold the pipeline in place.

We claim as our invention:

1. An underwater pipeline apparatus positioned on the floor of a body of water for transporting a fluid between two points, said apparatus comprising:
    an elongated tubular pipe section forming at least a section of said pipeline,
    weight-coating means carried by said pipe section and coextensive with at least a portion thereof which may be subjected to forces produced by water movement, and
    at least one radially-extending helical ridge formed outwardly of said coating means to reduce the lift coefficient of said pipe section and minimize the water movement forces tending to displace said pipe section,
    said ridge being at least a part of a helix having an axis concentric with said pipe section, 2. The apparatus as defined in claim 1 wherein said pipe section is formed of steel and said coating and ridge are made of a hydraulic cementitious material.

3. The apparatus as defined in claim 1 wherein said coating and ridge are molded onto said pipe section.

4. The apparatus as defined in claim 1 wherein said coating and ridge are sprayed onto said pipe.

5. The apparatus as defined in claim 1 including at least three longitudinally spaced ridges, each said ridge being at least a part of an individual helix having a pitch equal to between 7 and 15 times the pipe diameter.

6. The apparatus as defined in claim 5 wherein said coating has a rough exterior finish.

7. The apparatus as defined in claim 6 wherein said pipe has sufficient flexibility to be installed from a lay barge to the floor of said body of water.

References Cited

UNITED STATES PATENTS

| | | | |
|---|---|---|---|
| 1,904,675 | 4/1933 | Boyer | 138—178 XR |
| 2,910,835 | 11/1959 | Timothy | 61—72.3 |
| 2,982,971 | 5/1961 | Garaway | 4—172 |
| 3,232,637 | 2/1966 | Pennington et al. | 138—178 XR |
| 3,240,512 | 3/1966 | Pennington et al. | 138—178 XR |
| 3,267,969 | 8/1966 | Mallard | 138—178 |

LAVERNE D. GEIGER, *Primary Examiner.*

H. K. ARTIS, *Assistant Examiner.*